(12) United States Patent
Chen et al.

(10) Patent No.: US 9,652,434 B1
(45) Date of Patent: May 16, 2017

(54) MODIFICATION INDICATION IMPLEMENTATION BASED ON INTERNAL MODEL

(71) Applicant: EMC Corporation, Hopkinton, MA (US)

(72) Inventors: Jeegn Chen, Shanghai (CN); James O. Pendergraft, Raleigh, NC (US); Norman D. Speciner, Medway, MA (US); Yue Zhao, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 314 days.

(21) Appl. No.: 14/105,567

(22) Filed: Dec. 13, 2013

(51) Int. Cl.
*G06F 15/167* (2006.01)
*G06F 15/173* (2006.01)

(52) U.S. Cl.
CPC .............................. *G06F 15/17331* (2013.01)

(58) Field of Classification Search
CPC ........................ G06F 15/17331; G06F 12/0891
See application file for complete search history.

(56) References Cited

U.S. PATENT DOCUMENTS

| | | | |
|---|---|---|---|
| 6,470,360 B1* | 10/2002 | Vaitheeswaran | G06F 17/30312 |
| 7,139,892 B2* | 11/2006 | Peinado | G06F 21/79 |
| | | | 711/163 |
| 2006/0184613 A1* | 8/2006 | Stienessen | G06F 17/30902 |
| | | | 709/203 |
| 2010/0125588 A1* | 5/2010 | Mehra | G06F 17/30088 |
| | | | 707/754 |
| 2011/0066799 A1* | 3/2011 | Gold | G06F 11/1453 |
| | | | 711/111 |
| 2013/0031308 A1* | 1/2013 | De Spiegeleer | G06F 3/0604 |
| | | | 711/122 |
| 2013/0254240 A1* | 9/2013 | Kurita | G06F 17/30289 |
| | | | 707/802 |
| 2014/0280697 A1* | 9/2014 | Ambach | H04L 67/1097 |
| | | | 709/217 |
| 2014/0344327 A1* | 11/2014 | Lovric | H04L 67/2804 |
| | | | 709/203 |

\* cited by examiner

*Primary Examiner* — Tauqir Hussain
*Assistant Examiner* — Michael A Keller
(74) *Attorney, Agent, or Firm* — Barta, Jones & Foley, P.C.

(57) ABSTRACT

The subject disclosure is generally directed towards caching property values in a sparse cache for use in translating notifications to contain previous and source property values, e.g., for use in SMI-S compliant notifications (modification indications). When a modification indication that needs a previous instance and source instance, but only the source instance is available, a cache is accessed to obtain the previous property value. The modification indication is translated to contain the previous and source instance, and output, e.g., to a client subscriber. The cache is updated with the property values of the source instance in anticipation of being needed for a subsequent modification indication of that property.

20 Claims, 5 Drawing Sheets

MODIFICATION INDICATION IMPLEMENTATION BASED ON INTERNAL MODEL

BACKGROUND

The Storage Management Initiative Specification (SMI-S) provides a standard for information technology (IT) clients to follow when managing the storage devices and the like of any SMI-S compliant storage vendors. Among its many requirements, the SMI-S standard specifies some mandatory modification indication filters on specific properties (also referred to as attributes herein) of specific classes comprising Common Information Model (CIM) classes. When certain ones of these properties change, an event notification (referred to as a modification indication in SMI-S) needs to be sent to client subscribers.

For example, SMI-S requires that a management server send out a modification indication per client-side subscription whenever an instance of class CIM_StorageVolume has its OperationalStatus property changed. According to the specification, the modification indication needs to include two property values, namely SourceInstance (which in this example contains the changed, now current OperationalStatus property value for the CIM_StorageVolume instance), and PreviousInstance (for the previous OperationalStatus property value before the change occurred).

The underlying indication framework does not support sending the PreviousInstance value. Redesigning and implementing the framework to provide the PreviousInstance is possible, but would take an extremely significant amount of effort, and would be very risky with respect to being likely to introduce regressions. Another solution is to have a full cache containing all of the possibly needed information, and then use a polling thread to (periodically) detect the change by comparison against the current data. Such a solution is highly inefficient in performance, including in terms of memory and CPU usage, particularly when the number of instances is on the order of tens of thousands.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards providing modification indications to client subscribers that include previous property/attribute values. The technology is based upon lightweight caching configured on top of legacy components that are incapable of providing the previous attribute values.

In one or more aspects, a sparse cache is maintained by the SMI-S API layer for the previous attribute values. When an original modification indication containing the source instance is received for sending to client subscribers, the previous one or more values are obtained from the cache, and the modification indication is translated to include the previous property value before sending to the client subscribers. The sparse cache is then updated with the source attribute value(s) for use as the previous value(s) for any future modification indication.

It should be understood that any of the examples herein are non-limiting. For instance, one or more examples used herein show the SMI-S layer containing the modification handling logic and the sparse cache, however these components may be external to the layer and communicate with/be accessed by the SMI-S layer. Also, the properties/attributes described herein as being cached and used in modification indications may vary from those described, be extended and so forth. Moreover SMI-S is only one scenario that may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and notification communication in general.

Figure 1:
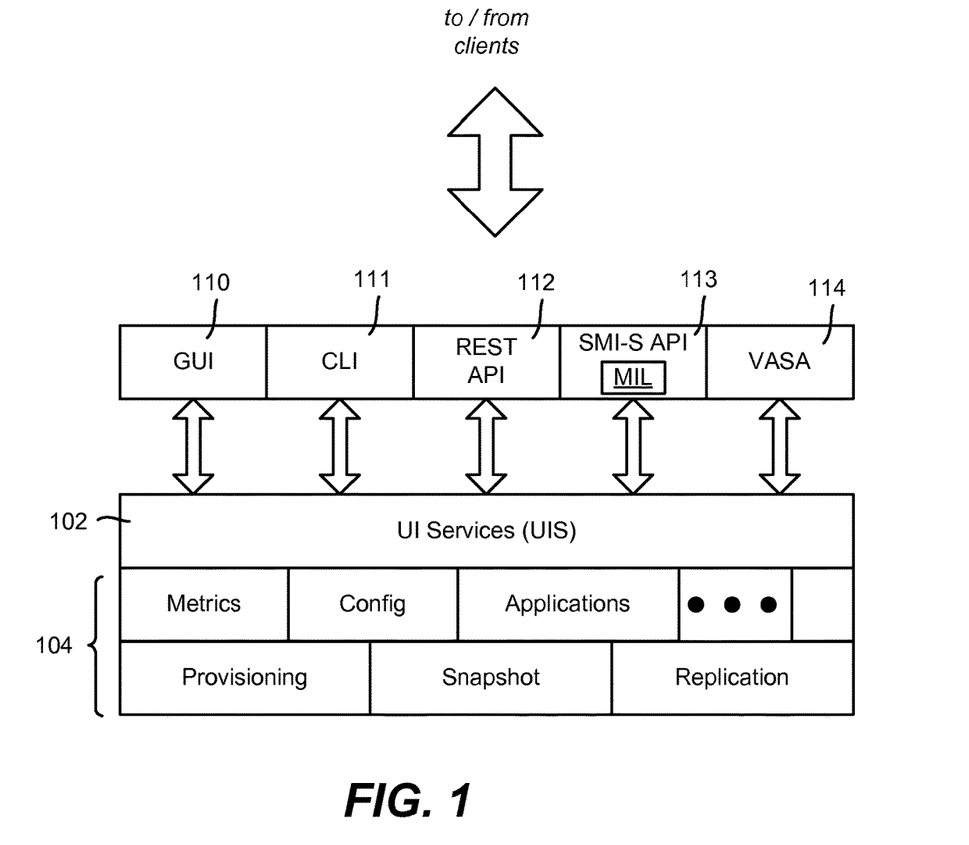
FIG. 1 is a block diagram showing an example layered configuration of various example components that may be used to provide SMI-S compliant notifications, according to one or more example embodiments.

FIG. 1 shows a block diagram of a layered framework that includes UI services 102 (UIS) for connecting with underlying storage-related technology (with some example components/modules and the like collectively labeled 104 in FIG. 1). For example, server hardware and/or software, including storage, may be represented by the layer or layers labeled 104 in FIG. 1.

Example layers (wrappers) for interfacing clients to the UI services 102 include a graphical user interface layer 110, a command Line Interface layer 111, a REST API layer 112, and SMI-S API layer 113 and a VASA (vSphere APIs for Storage Awareness) layer 114. As can be readily appreciated, these are examples, and not all such layers need be present or more may be present in a given implementation.

Figure 2:
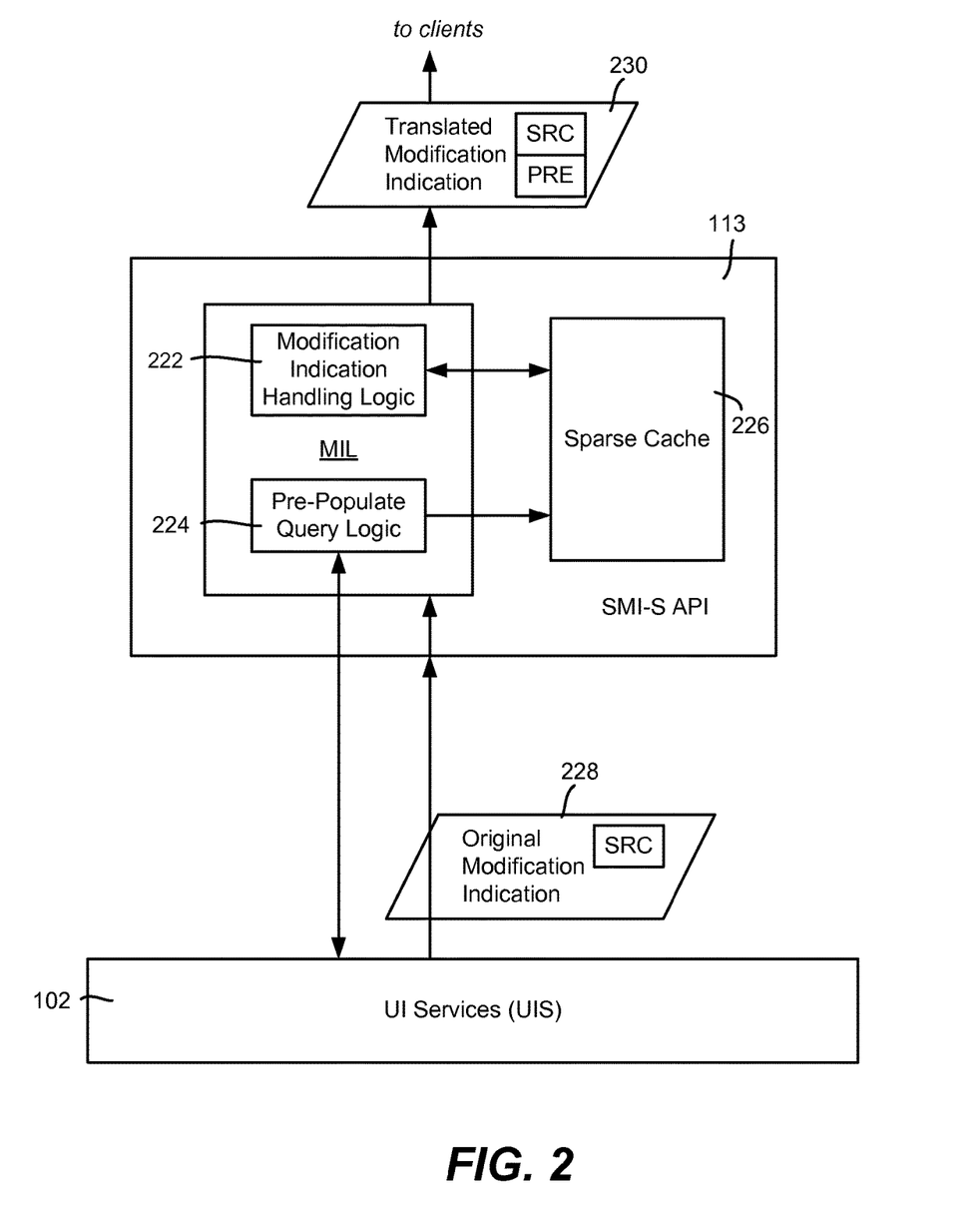
FIG. 2 is a block diagram showing example logic that may be used to translate a modification indication into a translated modification indication containing a source value and previous property value, according to one or more example embodiments.

As shown in FIG. 1 and exemplified in more detail in FIG. 1, in one or more embodiments the SMI-S API layer 113 contains modification implementation logic (MIL) components or the like as described herein. In FIG. 2, this is shown as modification indication handling logic 222 and pre-populate query logic 224, along with a sparse cache 226.

In general, when the system starts up, the pre-populate query logic 224 queries the UI services 102 to obtain the current property values for those in which the previous instance needs to be sent with the source instance in certain indications. That is, SMI-S only defines a limited number of indication filters (only part of attributes of some classes need be handled in previous instance):

CIM_StoragePool::TotalManagedSpace
CIM_ComputerSystem::OperationalStatus
CIM_RedundancySet::RedundancyStatus
CIM_StoragePool::TotalManagedSpace
CIM_StorageVolume::OperationalStatus
CIM_Logical Disk::OperationalStatus
CIM_FCPort::OperationalStatus
CIM_Logical Device::HealthState
CIM_ConcreteJob::PercentComplete
CIM_ConcreteJob::OperationalStatus
CIM_ConcreteJob::JobState After startup, the cache is also populated during system operation upon instance creation.

Indications in SMI-S are used to model events, to which SMI-S clients may subscribe using an indication filter. In general, an SMI-S server sends an indication to notify the client when the subscribed event occurs. By way of example of subscribing for an indication:

Send the indication when OperationalStatus of Storage Volume changes
SELECT*FROM CIM_InstModification
WHERE SourceInstance ISA CIM_StorageVolume AND
SourceInstance.CIM_StorageVolume::Operational
Status < >
PreviousInstance.CIM_StorageVolume::OperationalStatus As described herein, the UIS Layer 102 can only send a modification notification with SourceInstance but without PreviousInstance. This is represented in FIG. 2 by the Original Modification Indication including a "SRC" property value. Through a combination of sparse caching and indication translation, the PreviousInstance (PRE) is placed into a translated modification indication 230. This is shown in FIG. 2 in which the modification indication handling logic 222 accesses the sparse cache 226 (e.g., a lookup table/key value pair) for the appropriate value. Once no longer needed, e.g., when sent to the client subscribers, the modification indication handling logic 222 also accesses the sparse cache 226 to change the former value to the SourceInstance value, which thus becomes the previous value for any subsequent change.

Figure 3:
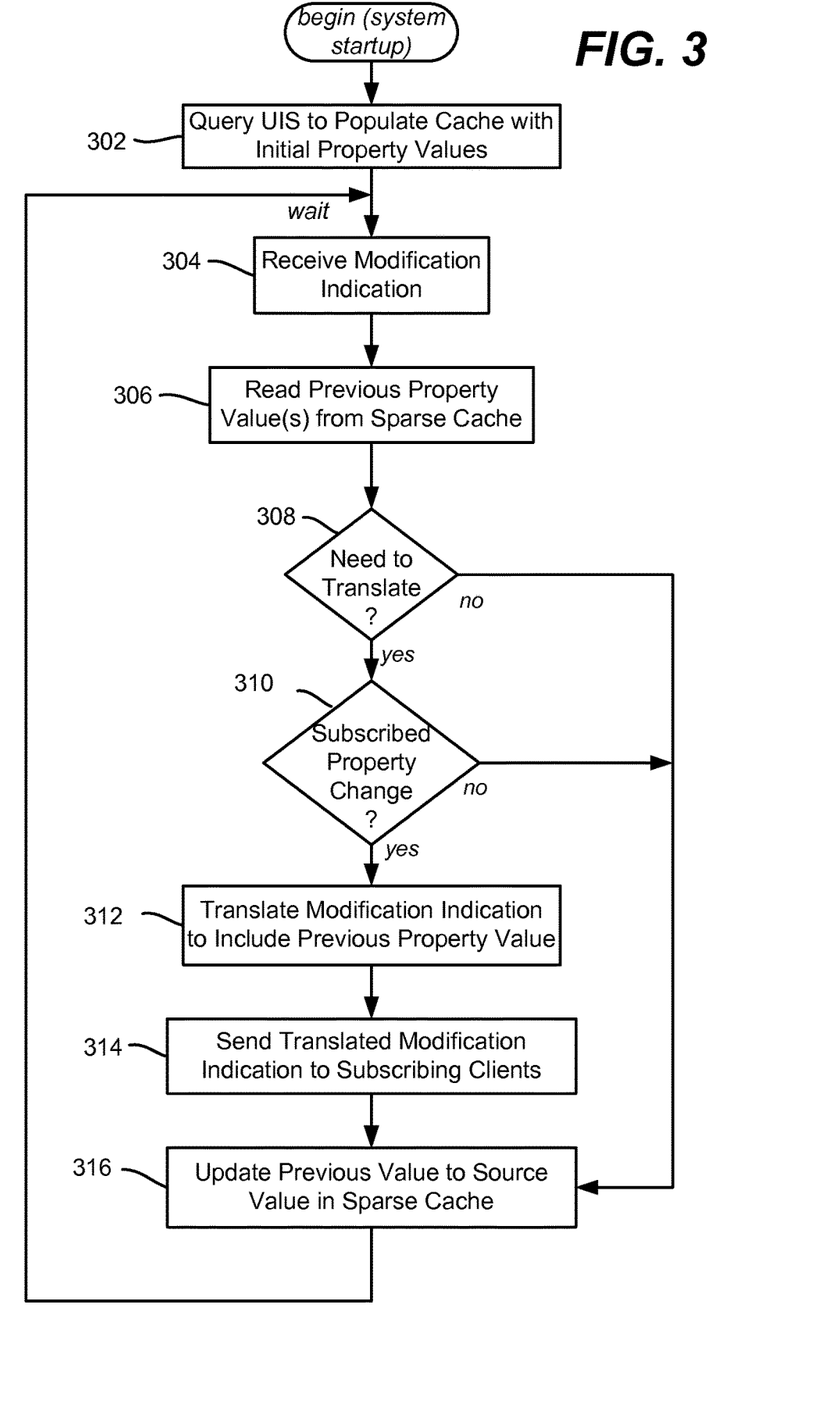
FIG. 3 is a flow diagram showing example steps that may be taken to obtain and generate a translated modification indication, according to one or more example embodiments.

FIG. 3 summarizes these aspects in the form of example steps of a flow diagram. Step 302 represents the SMI-S modification implementation logic caching the initial property values in anticipation of their being needed by SMI-S modification indication filters in the event of a future change. Note that in FIG. 3 and throughout, the term "value(s)" or "property value(s)" refers to a value set comprising as many values as needed to comply with the modification indication, whether a single property value or a set of two or more property values.

Later, when a UIS modification indication is sent from the UIS layer and received by the SMI-S layer implementation (step 304), the modification indication handling logic 222 is able to apply the cached value or values as needed on a copy of the source instance. Step 306 reads the cached value or values.

Step 308 represents evaluating whether a translation is needed based upon the value(s), and step 310 checks for whether the change is one that matters to clients; (e.g., the SRC indication may be received for a change to any attribute of the underlying UIS object, but the change may not be of interest to any potential SMI-S client). If translation is needed for an attribute of interest, step 312 performs the translation to produce the corresponding PreviousInstance so as to send (step 314) an SMI-S compliant modification indication.

At step 316, the SMI-S implementation also updates the value in cache, which will be used by the process on the next corresponding modification indication. Note that the sending operation may occur before, during or after the cache updating in one or more implementations.

Figure 4A:
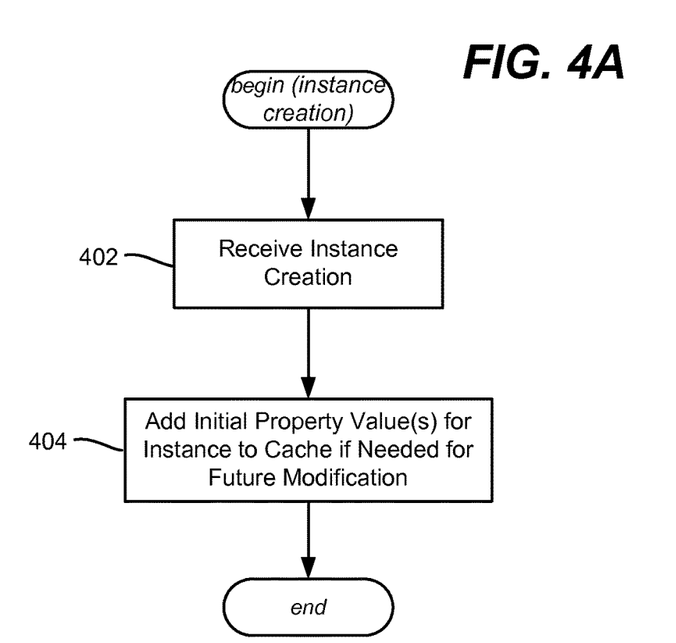
FIG. 4A is a flow diagram showing example steps that may be taken to update a cache upon instance creation in anticipation of future need for a property value, according to one or more example embodiments.

FIG. 4A exemplifies the cache updating at the time of an instance creation (step 402) in the form of example steps of a flow diagram. At step 404, any appropriate property values are cached to become the previous value set in case a future change occurs.

Figure 4B:
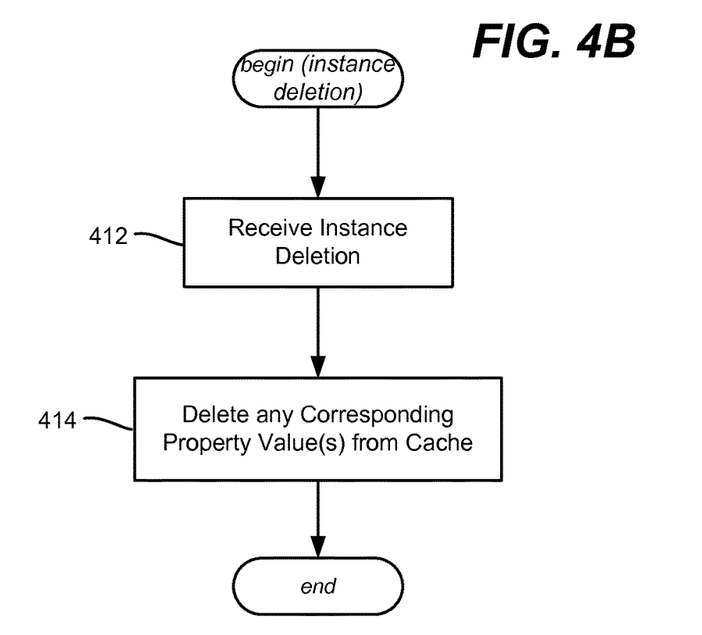
FIG. 4B is a flow diagram showing example steps that may be taken to delete cached data upon deletion of a resource having one or more cached property values, according to one or more example embodiments.

FIG. 4B exemplifies the cache updating at the time of an instance deletion (step 412) in the form of example steps of a flow diagram. At step 414, any appropriate property values are removed from the cache when a corresponding instance is deleted.

As can be seen, no redesign is needed in components below the SMI-S layer, avoiding the significant effort and risks of any such redesign. This also facilitates isolation between SMI-S layer and existing components.

At the same time, only the needed values (e.g., according to the specification) are cached, which is efficient in terms of memory/storage usage. This leverages the fact that there are many classes but only a few of them need a modification indication; for example, some instances may have on the order of tens of properties, and an SMI-S indication may only need one or two among them. No periodic full polling is needed, which is efficient in terms of CPU usage.

Example Computing Device

The techniques described herein can be applied to any device or set of devices capable of running programs and processes, such as the any of the layered components of FIG. 1. It can be understood, therefore, that handheld, portable and other computing devices and computing objects of all kinds including cell phones, tablet/slate computers and the like are contemplated for use in connection with the various embodiments. Accordingly, the below general purpose remote computer described below in FIG. 5 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 5:
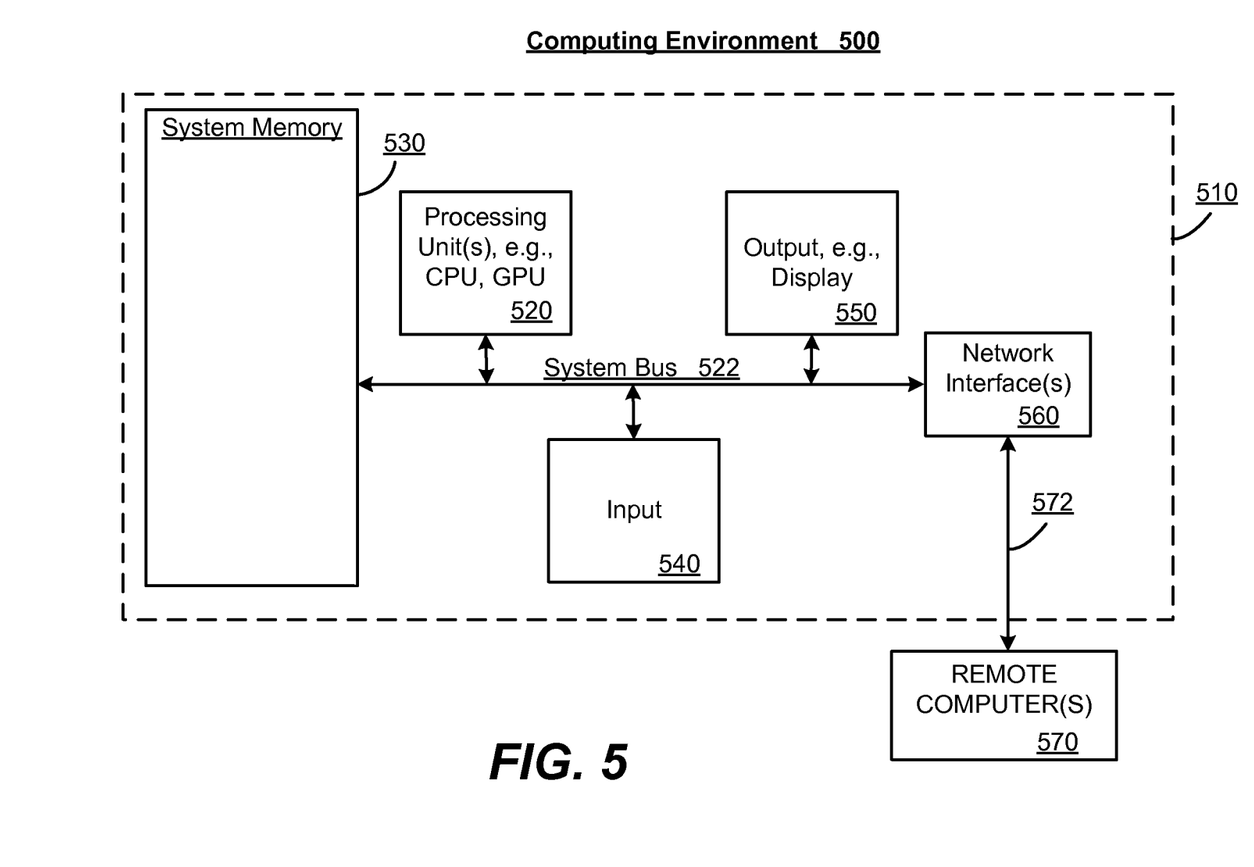
FIG. 5 is a block diagram representing an example computing environment into which aspects of the subject matter described herein may be incorporated.

FIG. 5 thus illustrates an example of a suitable computing system environment 500 in which one or aspects of the embodiments described herein can be implemented, although as made clear above, the computing system environment 500 is only one example of a suitable computing environment and is not intended to suggest any limitation as to scope of use or functionality. In addition, the computing system environment 500 is not intended to be interpreted as having any dependency relating to any one or combination of components illustrated in the example computing system environment 500.

With reference to FIG. 5, an example device for implementing one or more embodiments includes a general purpose computing device in the form of a computer 510. Components of computer 510 may include, but are not limited to, a processing unit 520, a system memory 530, and a system bus 522 that couples various system components including the system memory to the processing unit 520.

Computer 510 typically includes a variety of machine/ computer-readable media and can be any available media that can be accessed by computer 510. The system memory 530 may include computer storage media in the form of volatile and/or nonvolatile memory such as read only memory (ROM) and/or random access memory (RAM), and hard drive media, optical storage media, flash media, and so forth. By way of example, and not limitation, system memory 530 may also include an operating system, application programs, other program modules, and program data.

A user can enter commands and information into the computer 510 through input devices 540. A monitor or other type of display device is also connected to the system bus 522 via an interface, such as output interface 550. In addition to a monitor, computers can also include other peripheral output devices such as speakers and a printer, which may be connected through output interface 550.

The computer 510 may operate in a networked or distributed environment using logical connections to one or more other remote computers, such as remote computer 570. The remote computer 570 may be a personal computer, a server, a router, a network PC, a peer device or other common network node, or any other remote media consumption or transmission device, and may include any or all of the elements described above relative to the computer 510. The logical connections depicted in FIG. 5 include a network 572, such as a local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A computer-implemented method executed by one or more processors, the method comprising:
populating a cache on a system memory with one or more initial source property values corresponding to a modification indication filter on at least one property of an object, by a pre-populate query logic component of a computing device;
receiving, from a server, a modification indication of a change to the at least one property, the modification indication comprising one or more current source property values associated with the object, the one or more initial source property values further comprises one or more previous property values of the object before the change, wherein the one or more previous property values is an operational status;
accessing the one or more previous property values from the cache, by the computing device;
translating the modification indication into a Storage Management Initiative Specification (SMI-S) compliant translated modification indication, by the one or more processors, the translated modification indication comprising the one or more previous property values and the one or more current source property values; and
sending the translated modification indication to a remote computing device associated with a client, by the computing device, to notify the client of the change associated with the modification indication filter.

2. The computer-implemented method of claim 1 wherein the one or more previous property values is a first previous property value set, wherein the modification indication is a first modification indication; and further comprising:
populating the cache with the one or more current source property values, wherein the one or more current source property values are cached for use if another change occurs;
receiving a second modification indication of a second change to the at least one property, the second modification indication comprising one or more new current source property values associated with the object, wherein the one or more current source property values is a second previous property value set for the object;
reading the second previous property value set from the cache; and
translating the second modification indication into a second SMI-S compliant translated modification indication comprising the one or more new current source property values and the second previous property value set.

3. The computer-implemented method of claim 1 further comprising:
determining whether the change is a change of interest to the client; and
performing the translation of the modification indication if the change is of interest, wherein the modification indication is not translated if the change is not of interest to the client.

4. The computer-implemented method of claim 1, wherein outputting the modification indication further comprises:
sending the translated modification indication to a plurality of client subscribers.

5. The computer-implemented method of claim 1 further comprising:
populating the cache with the one or more initial source property values, including the one or more previous property values, during system startup.

6. The computer-implemented method of claim 1, wherein populating the cache with the one or more initial source property values as the one or more previous property values further comprises:
querying the server for the one or more initial source property values, by pre-populate query logic on the computing device.

7. The computer-implemented method of claim 1 further comprising:
sending the translated modification indication when operational status of a storage volume changes.

8. The computer-implemented method of claim 1, wherein receiving the modification indication comprises communicating with a UI services layer.

9. A system comprising:
a memory, the memory storing modification implementation logic, the modification implementation logic comprising modification indication handling logic;
a system bus coupling the memory to one or more processors;
the one or more processors executing the modification implementation logic to translate a modification indication received from a server, the modification indication comprising a source property value associated with an object, the modification indication corresponding to a change in a property of the object corresponding to a modification indication filter, the modification indication handling logic further configured to read a first previous property value from a sparse cache on the memory, wherein the previous property value is an operational status, translate the modification indication into a Storage Management Initiate Specification (SMI-S) compliant translated modification indication to notify a client of the change associated with the modification indication filter, and update the sparse cache with the source property value, the cached source property value is a second previous property value for use in an event of a subsequent change, the translated modification Indication comprising the first previous property value and the source property value.

10. The system of claim 9, the modification indication handling logic further configured to send the translated modification indication to a remote computing device associated with the client to notify the client of the change associated with the modification indication filter.

11. The system of claim 9, wherein an SMI-S API layer receives the modification indication from the server via a user interface (UI) services layer.

12. The system of claim 9, wherein an SMI-S API layer is configured to send the translated modification indication to the client, wherein the one or more processors further executes the modification implementation logic to determine whether the change is a change of interest to the client and perform the translation of the modification indication if the change is of interest to the client, wherein the modification indication is not translated if the change is not of interest to the client.

13. The system of claim 9, wherein the source property value corresponds to at least one of:
CIM_StoragePool::TotalManagedSpace,
CIM_ComputerSystem::OperationalStatus,
CIM_RedundancySet::RedundancyStatus,
CIM_StoragePool::TotalManagedSpace,
CIM_StorageVolume::OperationalStatus,
CIM_LogicalDisk::OperationalStatus,
CIM_FCPort::OperationalStatus,
CIM_LogicalDevice::HealthState,
CIM_ConcreteJob::PercentComplete,
CIM_ConcreteJob::OperationalStatus, or
CIM_ConcreteJob::JobState.

14. The system of claim 9, wherein the one or more processors further executes the modification implementation logic to query the server for one or more initial property values and pre-populate the sparse cache with the one or more initial property values.

15. The system of claim 9, wherein the one or more processors further executes the modification implementation logic to update the sparse cache based upon instance creation or instance deletion.

16. The system of claim 9, wherein the modification indication is a first modification indication and the source property value is a first source property value, and wherein the one or more processors further executes the modification implementation logic to translate a second modification indication comprising a second source property value associated with the object, the modification indication handling logic further configured to read the second previous property value from the sparse cache, translate the second modification indication into a second translated modification indication comprising the second previous property value and the second source property value.

17. One or more machine-readable storage devices comprising computer executable components, said components comprising a modification implementation logic component that, when executed, cause at least one processor to:
populate a cache associated with a first computing device with one or more initial source property values corresponding to a modification indication filter associated with a property of an object;
receive a modification indication of a change to the property of the object, the modification indication comprising a source instance associated with the object, the one or more initial source property values comprising a first previous property value of the object before the change, wherein the previous property value is an operational status;
read the first previous property value corresponding to the source instance from the cache;
on determining a translation of the modification indication is to be performed,
(i) translate the modification indication into a Storage Management Initiative Specification (SMI-S) compliant translated modification indication comprising the first previous property value;
(ii) update cached data to contain the source property value, the cached source property value is a second previous property value for use in an event of a subsequent change; and
(iii) output the translated modification indication to a second computing device associated with a client to notify the client of the change associated with the modification indication filter.

18. The one or more machine-readable storage devices of claim 17 wherein the modification implementation logic is further executed to cause the at least one processor to:
determine whether the change is a change of interest to the client and perform the translation of the modification indication if the change is of interest to the client, wherein the modification indication is not translated if the change is not of interest to the client.

19. The one or more machine-readable storage devices of claim 17 wherein the modification implementation logic is further executed to cause the at least one processor to:
populate the cache with one or more source property values based upon an instance creation in anticipation of a future modification; and
remove data from the cache based upon an instance deletion.

20. The one or more machine-readable storage devices of claim 17 wherein the modification implementation logic is further executed to cause the at least one processor to:
output a non-translated modification indication upon determining that a previous property value is not needed for the modification indication.

* * * * *